Patented Aug. 6, 1929.

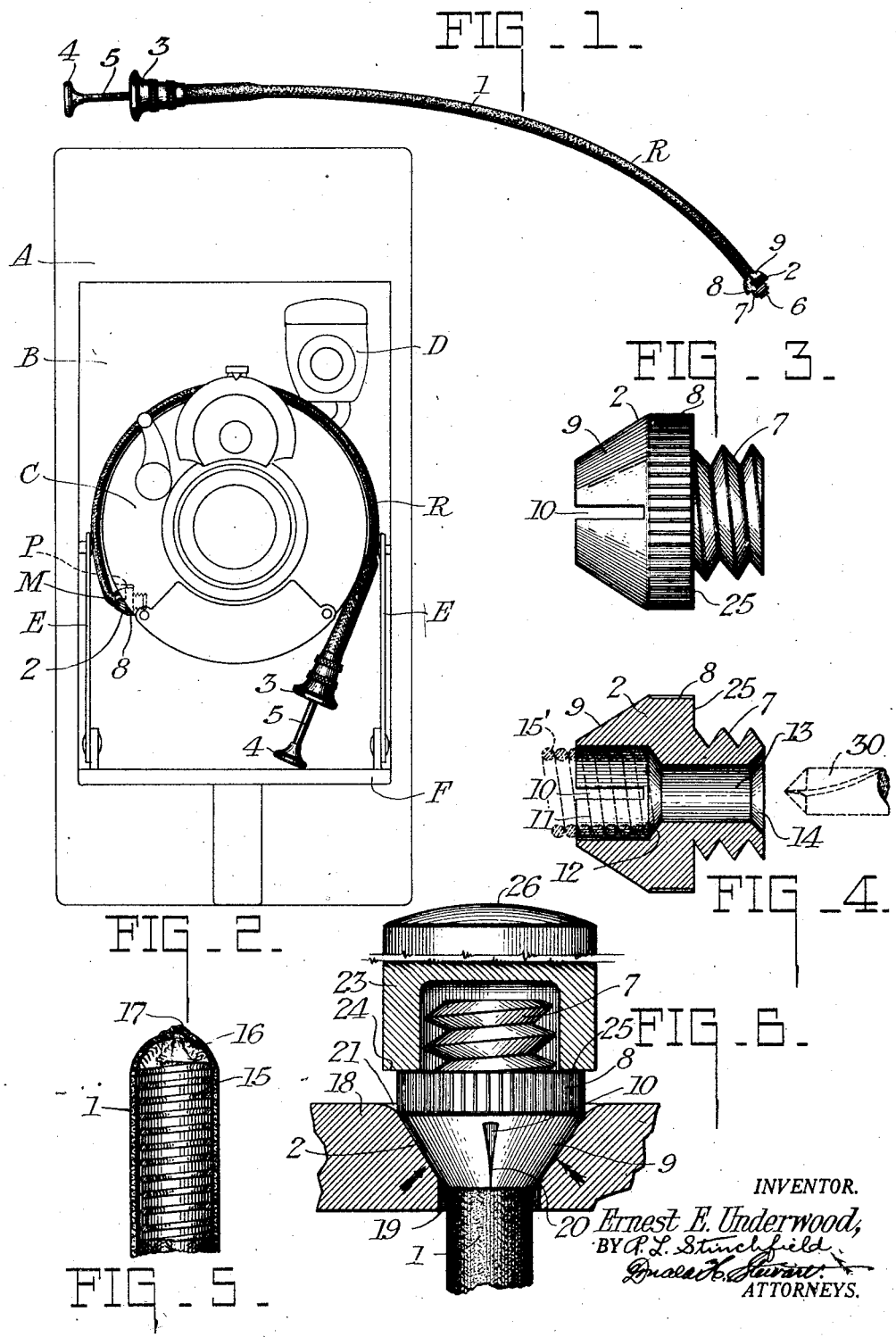

1,723,752

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

METHOD OF ASSEMBLING CABLE RELEASES.

Application filed July 5, 1923. Serial No. 649,463.

This invention relates to photography and more particularly to cable releases used on photographic cameras for actuating the shutter. One object of my invention is to provide a shutter-engaging ferrule which is simple to make; another object is to provide a shutter ferrule of very small dimensions, so that the shutter end of the cable is extremely flexible; another object is to provide a cable release which can be easily manufactured and assembled; and still another object is to provide a ferrule which can be applied securely over the flexible cable covering, retaining the cable in place as the ferrule is clamped thereon; other objects will appear from the following specification, the novel features being pointed out in the claims at the end thereof.

In the drawings, wherein like reference characters denote like parts throughout:

Fig. 1 is a cable release constructed in accordance with and illustrating one embodiment of my invention;

Fig. 2 is a front elevation of my cable release enclosed in a camera;

Fig. 3 is a greatly enlarged detail side elevation of my shutter ferrule;

Fig. 4 is a section of the ferrule shown in Fig. 3;

Fig. 5 is a section through an end of a partially completed cable release; and

Fig. 6 is an enlarged view of the shutter ferrule showing also a section through a ferrule-applying device.

The modern type of ultra thin cameras is very compact, leaving but little clearance into which a cable release may be folded. As shown in unshaded lines in Fig. 2, wherein a well known type of camera is outlined and is drawn to scale, A represents the camera body, B the opening which may be closed by the door or bed F, and E the bed braces. The shutter C and finder D are movable on a suitable carrier into the position shown, in which position the bed may be closed. The threaded opening P of shutter C is shown in broken lines, and a sharp bend M must be made in the cable release R to fold it as shown.

Coming now to my invention, the cable release R consists of the usual fabric covering 1, which terminates at one end in a shutter ferrule 2, and at the other end in a finger release consisting of a finger grip 3 and a push button 4. Push button 4 is carried by a rod 5 which is affixed to a flexible cable inside of covering 1, this cable also carrying at the other end a head 6 which cooperates with the shutter C to make an exposure.

For the cable itself I prefer to use a finely wound wire spiral, such as is well known in the art, being shown for instance, in U. S. Patent No. 1,297,327, Dakin & Underwood, Mar. 18, 1919. This patent also shows the same type of tubular protective covering which I use in my present invention, that is, a coiled wire tubular member corresponding to the present spring coil 15 covered with a "stocking" or fabric covering 1,—see Fig. 5.

The shutter ferrule 2 consists of a metallic part which may be made of soft brass, having a knurled edge 8, a conical end 9 and a threaded part 7. The conical end 9 is preferably slotted through at 10, although there may be one or more slots if desired. The cone end 9 is bored out at 11, and an opening of smaller diameter, 13, is cut under the threaded portion 7. This may be beveled, as at 14, and a beveled part 12 connects the two bores 11 and 13. The aperture 11 and shoulder 12 form a seat for the flexible cable, as will be hereinafter described.

The method of assembling is as follows: Taking a wire tubular member 15, a covering 1 is slipped over it and brought to a point at 16 with glue 17. This rounded end slips readily into bore 11, coming to a stop against shoulder 12. The cable thus formed is slipped through an aperture 19 in plate 18, there being a reamed or outwardly flaring top 21 to the aperture. A flanged punch 23 is then positioned with the bottom edge 24 resting on flange 25 of ferrule 2, and, by striking the end 26 of the tool a sharp blow, the cone-shaped end 9 is deformed, clinching the covering 1 and spring 11 firmly in the ferrule 2. This clinching action takes place in the following manner: The thin end of the cone 9 bends most readily and therefore bends first, after which more or less of the remaining flange is clinched upon the cable. The slot 10 is generally partially closed, as indicated at 20, Fig. 6, although it may entirely close up in some cases. The thicker wall of the seat 11 bends the least and, of course, the knurled portion 8 is not deformed at all.

It should be noted that the seat formed by bore 11 and the beveled shoulder 12 perform important functions in the assembling operation. First, shoulder 12 forms a stop for limiting the distance that cable 15 and covering 1 can be inserted into the ferrule. Second, cable 15 closely approaching in outside diameter the inside diameter 11 of ferrule 2, is positioned against lateral and longitudinal displacements when ferrule flange 9 is forced into the crimping die 21, as the force is in the direction of the arrows, Fig. 6. The cable cannot become deformed because of the equal force applied all around the periphery of flange 9, and because the seat in the ferrule prevents the spring from being moved. Also, the cable does not tend to pull out as the force is upwardly and inwardly at the same time automatically holding the cable in place.

The covering 1 of the cable is very thin, so that, of course, the seat 11, 12 is large enough to accommodate the spring 15 and covering 1, and does not materially affect holding the cable rigid. The flange 9 holds the covering 1 smooth and even. After uniting the cable and ferrule the glue tipped end 16 of the covering 1 is removed by inserting a suitable sharp pointed instrument 30 through bore 13 and turning it. This instrument, as shown in Fig. 4, is approximately the size of bore 13, but can turn freely therein, so that the hardened glue 17 is drilled out, leaving a perfectly smooth interior for the shutter actuating tip 6 to slide in.

In Fig. 5 the spring convolutions 15 are shown spaced one from the other, this structure being suitable for short release where exceptional flexibility throughout its length is desired. In Fig. 4 the spring convolutions 15′ are shown closely spaced, making a stronger but less flexible release.

I am aware that changes may be made from the embodiment of my invention shown in the drawings and described in this specification, but I contemplate as within the scope of this invention all such changes as come within the terms of the following claims.

Having thus described my invention, what I claim as new and desire to secure by Letters Patent is:

1. The method of assembling a cable release including a flexible coiled spring cable which terminates in a rigid ferrule, consisting of holding a plurality of the spring convolutions against longitudinal and lateral displacement, and crimping the ferrule over the convolutions so held.

2. The method of assembling a cable release including a flexible tubular member comprising a coiled spring cable and a cover over the cable, said flexible member terminating in a rigid ferrule, consisting of enclosing an end portion of the spring cable and covering in a housing included in the ferrule, closely fitting the end portion of the ferrule member, thus holding the end of the spring and cover against movement, and then clamping the housing inwardly upon the spring and cover.

3. The method of assembling a cable release comprising a flexible coil spring enclosed in a casing and terminating at one end in a rigid ferrule, consisting of enclosing an end portion of the coiled spring and covering in a seat formed by a tapering flange on the ferrule, and compressing the flange from the thinnest portion towards the thickest portion, whereby the coiled spring and covering are retained in place during the clamping operation.

4. The method of assembling a cable release including a flexible member consisting of a coiled spring and a covering enclosing the coiled spring, there being a rigid ferrule on one end of the flexible member, consisting of placing the spring in the covering, pointing an end of the covering with glue, and entering it into a seat in the ferrule, clamping the flange of the ferrule on the covered cable and spring, and removing the glue tipped end of the covering through a hole in the ferrule.

Signed at Rochester, N. Y., this 29th day of June, 1923.

ERNEST E. UNDERWOOD.